United States Patent
Richter

(10) Patent No.: US 11,896,926 B2
(45) Date of Patent: Feb. 13, 2024

(54) DEVICES, SYSTEMS AND METHODS FOR FLUX REMOVAL FROM FURNACE PROCESS GAS

(71) Applicant: BTU INTERNATIONAL, INC., No. Billerica, MA (US)

(72) Inventor: Paul Richter, Chelmsford, MA (US)

(73) Assignee: BTU International, Inc., No. Billerica, MA (US)

( * ) Notice: Subject to any disclaimer, the term of this patent is extended or adjusted under 35 U.S.C. 154(b) by 0 days.

(21) Appl. No.: 17/453,395

(22) Filed: Nov. 3, 2021

(65) Prior Publication Data

US 2022/0054970 A1 Feb. 24, 2022

Related U.S. Application Data

(63) Continuation of application No. 16/183,200, filed on Nov. 7, 2018, now Pat. No. 11,202,983.

(Continued)

(51) Int. Cl.
  *B01D 47/06* (2006.01)
  *B23K 37/00* (2006.01)
  (Continued)

(52) U.S. Cl.
  CPC ............. *B01D 47/06* (2013.01); *B01D 45/08* (2013.01); *B01D 50/40* (2022.01); *B23K 37/00* (2013.01);
  (Continued)

(58) Field of Classification Search
  CPC ........ B01D 47/06; B01D 45/08; B01D 50/40; B01D 47/021; B01D 47/05;
  (Continued)

(56) References Cited

U.S. PATENT DOCUMENTS 2,373,565 A * 4/1945 Hupp .................. B01D 47/021
                                                            55/516
2,826,306 A * 3/1958 Burns ................ B01D 17/0211
                                                            210/114

(Continued)

FOREIGN PATENT DOCUMENTS

JP         2007-53158      *   3/2007

OTHER PUBLICATIONS

EPO translation of JP2007-53158 (Year: 2007).*
International Search Report and Written Opinion of the International Searching Authority, dated Jan. 29, 2019, for related PCT/US2018/59614 filed on Nov. 7, 2018.

*Primary Examiner* — Stephen Hobson
(74) *Attorney, Agent, or Firm* — Preti Flaherty Beliveau & Pachios LLP

(57) ABSTRACT

System and methods for solder flux removal from a gas stream is disclosed. In one aspect, the system includes: a scrubber chamber having a gas inlet and a gas outlet through which the gas stream is introduced into and withdrawn from the scrubber chamber; at least one rinse agent delivery mechanism for introducing a rinse agent into the scrubber chamber for contact with the gas stream, the rinse agent being at a temperature for condensing a first portion of the flux from the gas stream; a condenser portion of the scrubber chamber containing the rinse agent for receiving the gas stream, the rinse agent being at a temperature for condensing a second portion of the flux in the gas stream; and a condensed flux removal apparatus adapted for removal from the scrubber chamber of at least a portion of the rinse agent and the flux which has condensed.

11 Claims, 10 Drawing Sheets

Related U.S. Application Data

(60) Provisional application No. 62/684,485, filed on Jun. 13, 2018, provisional application No. 62/583,152, filed on Nov. 8, 2017.

(51) Int. Cl.
*B01D 45/08* (2006.01)
*B01D 50/40* (2022.01)
*B23K 1/008* (2006.01)
*B01D 47/05* (2006.01)
*B03D 1/02* (2006.01)
*B01D 47/02* (2006.01)

(52) U.S. Cl.
CPC ............ *B01D 47/021* (2013.01); *B01D 47/05* (2013.01); *B03D 1/02* (2013.01); *B23K 1/008* (2013.01)

(58) Field of Classification Search
CPC .......... B01D 2247/04; B01D 2247/106; B23K 37/00; B23K 1/008; B23K 3/08; B03D 1/02
See application file for complete search history.

(56) References Cited

U.S. PATENT DOCUMENTS

| | | | | |
|---|---|---|---|---|
| 3,811,247 A * | 5/1974 | Huppke | ............... | B01D 53/14 261/112.1 |
| 4,263,021 A * | 4/1981 | Downs | ............... | B01D 53/504 95/224 |
| 4,322,392 A * | 3/1982 | Gleason | ............... | C01B 17/60 423/519.2 |
| 4,494,967 A * | 1/1985 | Barth | ............... | B05B 14/49 95/193 |
| 4,557,202 A * | 12/1985 | Warner | ............... | F28F 9/26 165/145 |
| 4,634,582 A * | 1/1987 | Sliger | ............... | B01D 53/78 423/575 |
| 4,668,382 A * | 5/1987 | Jameson | ............... | B03D 1/16 210/221.2 |
| 4,690,807 A * | 9/1987 | Saleem | ............... | B01D 53/501 423/545 |
| 4,861,558 A * | 8/1989 | Lehto | ............... | B01D 47/12 422/106 |
| 4,954,320 A * | 9/1990 | Birmingham | ......... | B01J 19/088 422/186.04 |
| 4,996,781 A * | 3/1991 | Mishina | ............... | B23K 1/012 34/74 |
| 5,045,117 A * | 9/1991 | Witherell | ............... | H05K 3/26 134/108 |
| 5,080,696 A * | 1/1992 | Marchand | ............... | B01D 53/68 95/187 |
| 5,080,802 A * | 1/1992 | Cairo, Jr. | ............ | B01D 17/0205 210/197 |
| 5,112,375 A * | 5/1992 | Brown | ............... | B01D 45/08 55/440 |
| 5,147,421 A * | 9/1992 | Yung | ............... | B01D 47/06 95/189 |
| 5,246,471 A * | 9/1993 | Bhat | ............... | B01D 53/504 423/242.3 |
| 5,397,001 A * | 3/1995 | Yoon | ............... | B01F 25/31112 261/122.1 |
| 5,512,072 A * | 4/1996 | Laslo | ............... | B01D 53/504 261/87 |
| 5,641,341 A * | 6/1997 | Heller | ............... | B23K 1/203 165/95 |
| 6,063,352 A * | 5/2000 | Risse | ............... | C01C 1/247 423/547 |
| 6,092,667 A * | 7/2000 | Steinmuller | ......... | B01F 23/234 210/220 |
| 6,139,807 A * | 10/2000 | Risse | ............... | B01D 53/502 422/171 |
| 6,273,940 B1 * | 8/2001 | Bielawski | ............ | B01D 53/504 95/228 |
| 6,277,343 B1 * | 8/2001 | Gansley | ............... | B01J 8/26 423/240 R |
| 6,290,923 B1 * | 9/2001 | Sollers | ............... | C07C 263/20 423/245.2 |
| 6,306,357 B1 * | 10/2001 | Simonson | ............ | D21C 11/06 423/220 |
| 6,402,816 B1 * | 6/2002 | Trivett | ............... | B01D 47/021 96/353 |
| 8,038,012 B2 * | 10/2011 | Urizar | ............... | C02F 1/24 209/164 |
| 8,865,098 B2 * | 10/2014 | Suchak | ............... | B01D 53/64 423/210 |
| 8,925,728 B2 * | 1/2015 | Britz | ............... | B03D 1/00 209/164 |
| 8,968,450 B1 * | 3/2015 | Hepburn | ............... | B01D 53/504 96/342 |
| 9,346,007 B2 * | 5/2016 | Reddy | ............... | B01D 53/60 |
| 9,370,745 B2 * | 6/2016 | Xu | ............... | B01D 53/502 |
| 9,504,957 B2 * | 11/2016 | Liu | ............... | B01D 53/504 |
| 9,707,505 B2 * | 7/2017 | Hernandez Olvera | .................... | B01D 53/38 |
| 9,839,876 B2 * | 12/2017 | Tsai | ............... | B01D 53/79 |
| 10,016,721 B1 * | 7/2018 | Luo | ............... | B01D 53/507 |
| 10,112,145 B1 * | 10/2018 | Luo | ............... | B01D 53/505 |
| 10,207,220 B2 * | 2/2019 | Luo | ............... | B01D 53/502 |
| 10,207,247 B2 * | 2/2019 | Fedorov | ............... | B01J 8/44 |
| 10,843,124 B2 * | 11/2020 | Hooper | ............... | B01D 53/78 |
| 11,027,234 B2 * | 6/2021 | Luo | ............... | B01D 53/77 |
| 11,202,983 B2 * | 12/2021 | Richter | ............... | B01D 47/06 |
| 11,224,838 B2 * | 1/2022 | Luo | ............... | B01D 53/1412 |
| 2003/0071372 A1 * | 4/2003 | Scherzinger | ......... | B03D 1/1431 261/DIG. 27 |
| 2004/0200778 A1 * | 10/2004 | Gabl | ............... | D21B 1/325 210/744 |
| 2007/0057020 A1 * | 3/2007 | Shibamura | ............ | B23K 3/08 228/101 |
| 2007/0137154 A1 * | 6/2007 | Agnello | ............... | B01D 45/08 55/440 |
| 2008/0237035 A1 * | 10/2008 | Kurusu | ............... | F24F 8/133 422/120 |
| 2008/0308502 A1 * | 12/2008 | Jameson | ............... | B03D 1/02 210/703 |
| 2010/0024646 A1 * | 2/2010 | Brookman | ............ | B01D 47/06 96/276 |
| 2010/0176062 A1 * | 7/2010 | Kanel | ............... | C02F 1/24 210/150 |
| 2010/0193408 A1 * | 8/2010 | Jameson | ............... | B03D 1/242 209/164 |
| 2010/0221162 A1 * | 9/2010 | Welp | ............... | B01D 53/501 423/220 |
| 2013/0180895 A1 * | 7/2013 | Rinne | ............... | G01F 23/296 209/173 |
| 2014/0001102 A1 * | 1/2014 | Blendinger | ......... | B03D 1/1493 209/164 |
| 2014/0127107 A1 * | 5/2014 | Suchak | ............... | B01D 53/64 423/210 |
| 2014/0245892 A1 * | 9/2014 | Hernandez Olvera | .................... | B01D 47/021 96/235 |
| 2015/0174588 A1 * | 6/2015 | Danyliw | ............... | B03D 1/02 209/166 |
| 2016/0089679 A1 * | 3/2016 | Prestes | ............... | B01F 25/4337 209/166 |
| 2016/0279726 A1 * | 9/2016 | Hiyama | ............... | B23K 3/0653 |
| 2017/0271033 A1 * | 9/2017 | Dodson | ............... | B01F 23/808 |
| 2018/0015310 A1 * | 1/2018 | Choi | ............... | A62B 23/02 |
| 2018/0093220 A1 * | 4/2018 | Shimohira | ............ | B03D 1/24 |
| 2018/0127288 A1 * | 5/2018 | Kirk | ............... | B03D 1/1462 |
| 2018/0140991 A1 * | 5/2018 | Li | ............... | B01D 47/021 |
| 2018/0243757 A1 * | 8/2018 | Jameson | ............... | B03D 1/028 |
| 2023/0211266 A1 * | 7/2023 | Koechel | ............... | G01N 5/04 95/268 |

* cited by examiner

DEVICES, SYSTEMS AND METHODS FOR FLUX REMOVAL FROM FURNACE PROCESS GAS

STATEMENT REGARDING FEDERALLY SPONSORED RESEARCH OR DEVELOPMENT

Not Applicable

BACKGROUND OF THE INVENTION

The present invention relates to the field of reflow soldering processes. Reflow soldering processes typically utilize solder pastes which contain conductive metal alloys and a flux to promote solder joint cleaning and to reduce surface tension to allow appropriate solder flow and placement on a circuit board or other substrate. As the temperature increases during the reflow process, the flux first melts and in its liquid state cleans the part on which it is in contact. As the temperature continues to rise, a portion of the flux vaporizes and is carried out of the furnace chamber by exhaust gas. During transport of the exhaust gas in the furnace, flux can condense on cooler areas in the furnace and drip down onto the product being processed. The product thus affected requires rework or may need to be scrapped which results in reduction of yield of the product being processed. Various techniques are known for removing flux from exhaust gas in a reflow furnace. One known technique utilizes condensation traps and another known technique utilizes catalytic converters. These techniques have significant deficiencies which render them less than effective solutions to the problem of flux removal.

Condensation trap devices are commonly used for removing flux from a process gas stream in commercial reflow furnaces. These devices typically include relatively large chilled water-cooled condenser plate(s) arrayed in the gas stream in such a way as to allow a portion of the vaporized flux in the gas to condense to a liquid phase on the chilled plates and to drip down by gravity to a catchment tray. Such condensation trap devices have several deficiencies. The physical size of condenser plates limits the effective plate area which can be reasonably packaged into a reflow furnace and thus reduces the removal efficiency to approximately 30%. As flux condenses on the chilled condenser plates, some condensed flux will transition from liquid to solid phase and adhere to the plates. Over time, sufficient solid flux will accumulate on the condenser plates and render them ineffective. Cleaning the solid flux from the condenser plates is a laborious and time-consuming process. The furnace must first be cooled and the condenser plates removed for cleaning. Cleaning of the condenser plates is performed using caustic solvents by either manual scrubbing or steam cleaning to remove the adhered flux.

Catalytic converters likewise have several deficiencies when used for flux management in reflow furnaces. Catalyst materials must be carefully selected for specific flux and solvent compositions because a single catalyst may not work effectively for all compositions. Catalyst materials are typically precious metals which are rare and expensive. The flux materials are resinous in nature which makes them difficult to process through a catalytic converter. The resins can clog the active surface area of the catalyst bed, rendering it ineffective, and catalysts must be replaced frequently which results in a high maintenance costs. Periodic high temperature regeneration cycles may also be required to provide an acceptable life span for the catalysts.

BRIEF SUMMARY OF THE INVENTION

The present invention addresses the deficiencies of known condenser and catalytic converter flux removal systems and provides efficient and superior systems, devices and methods for gas stream flux removal in reflow furnaces. Flux laden process gas is directed into a gas to liquid scrubbing systems. In one aspect, the process gas is subjected to a spray mist of liquid solvent or rinse agent which separates the flux from the gas and entraps it in the recirculating solvent. In another aspect, the process gas is exposed to solvent or rinse agent and pulled through a scrubber column where the rinse agent condenses the flux thereby capturing the flux from the process gas.

For purposes of the present application, the term "solvent(s)" is understood to refer to a formulation including a solvent and/or a rinse agent for capturing, dissolving or otherwise entrapping flux and can consist of formulations including more than one component.

In one aspect of the invention, the separation of flux occurs in three ways: First, the flux laden process gas is introduced into a scrubber chamber through a fitting or elbow which is cooled by the spray mist and which allows some condensation removal of the flux to occur as the gas passes out of the elbow into the scrubber chamber. Second, the gas is directed down into a pool of solvent at the bottom of the device and some flux is removed by direct condensation of the flux in the lower temperature pool. Third, the gas then flows up and through the spray mist where chemical interaction between the gas and the spray mist removes remaining flux and entraps it in the recirculating solvent. The gas then travels through an optional condenser which condenses solvent which may be present in the gas stream and allows the solvent to drain back into the scrubber chamber by gravity. The cleaned gas can be returned to the furnace process chamber for reuse. The system can be used without modification with many types of solvent sprays.

While one embodiment of this device is oriented vertically to utilize gravity to drain condensate in the scrubber chamber, the devise can also be oriented horizontally, or at a diagonal angle for better packaging in a furnace. When oriented at an angle greater than vertical, sumps and transfer pumps can be used to properly scavenge rinse agent and return it to the active reservoir tank.

In one aspect, the invention features a system for removal of a flux in a gas stream which includes: a scrubber chamber having a gas inlet through which the gas stream is introduced into the scrubber chamber, and a gas outlet through which the gas stream is withdrawn from the scrubber chamber; at least one rinse agent delivery mechanism for introducing a rinse agent into the scrubber chamber for contact with the gas stream, the rinse agent being at a temperature for condensing a first portion of the flux from the gas stream; a condenser portion of the scrubber chamber containing the rinse agent for receiving the gas stream, the rinse agent being at a temperature for condensing a second portion of the flux in the gas stream; and a condensed flux removal apparatus adapted for removal from the scrubber chamber of at least a portion of the rinse agent and the flux which has condensed.

In one embodiment, the system includes a mist separator fluidically connected to the scrubber chamber and comprising at least one component for separation from the gas stream a portion of the rinse agent and the flux remaining in the gas stream flowing therethrough.

In another embodiment, the mist separator includes a plurality of perforated plates in series.

In yet another embodiment, the system includes a condenser fluidically connected to the scrubber chamber and operated at a select temperature for separating from the gas stream at least a portion of the rinse agent and the flux remaining in the gas stream flowing therethrough.

In one embodiment, the rinse agent includes a solvent which forms a stable dispersion of the flux and the solvent. In another embodiment, the rinse agent includes a water component and a second component forming at least one of a stable dispersion and a metastable suspension of the flux and the water component. In yet another embodiment, the second component includes at least one of a detergent and a surfactant.

In one embodiment, the condensed flux removal apparatus includes a first liquid collector. The first liquid collector includes: a tank having a first compartment and a second compartment and a wall separating the first compartment and the second compartment defining a weir at an upper end of the wall; wherein the first compartment is operative to contain a liquid containing the rinse agent and the flux received from the scrubber chamber, the liquid over a time period being separated into a flux phase disposed in an upper layer of the first compartment and a rinse agent phase disposed in a lower layer of the first compartment; a rinse supply apparatus for introducing the rinse agent into the first compartment in an amount sufficient to cause the flux phase to flow over the weir from the first compartment into the second compartment; and a flux waste removal apparatus for removing the flux phase from the second compartment.

In another embodiment, the condensed flux removal apparatus includes a second liquid collector. The second liquid collector includes a valve system selectively coupled to the first liquid collector and second liquid collector such that the first and the second liquid collectors are alternately coupled to the scrubber chamber to collect the rinse agent and the flux, while the other of the liquid collectors is decoupled from the scrubber chamber to permit removal of the flux phase from the second compartment of the decoupled flux collector.

In one embodiment, at least one of the scrubber chamber and the condenser includes a packing material for increasing a residence time of the gas stream travelling therethrough.

In another embodiment, the first liquid collector includes a cover of a geometric shape selected for a predetermined flow path of the liquid contained in the liquid collector.

In yet embodiment, the system includes a skimming device for capture or directing flow of the flux phase.

In one embodiment, the rinse agent delivery mechanism includes at least one spray nozzle.

In another aspect, the invention features another system for removal of a flux in a gas stream, the system including: a scrubber chamber having a gas inlet through which the gas stream enters the scrubber chamber, and a gas outlet through which the gas stream exits the scrubber chamber; a gas withdrawal device fluidically connected to the scrubber chamber and operating at a condition for withdrawing the gas stream from the gas inlet to the gas outlet; a rinse agent entry port proximal to the gas inlet through which a rinse agent enters the scrubber chamber; a rinse agent exit port for draining the rinse agent from the scrubber chamber; a heat exchanger mechanism fluidically connected to the rinse agent exit port and the rinse agent entry port, the heat exchanger mechanism adapted for receiving the rinse agent from the rinse agent exit port, cooling the rinse agent to a select rinse agent entry temperature, and delivering the rinse agent at the select rinse agent entry temperature to the scrubber chamber via the rinse agent entry port; wherein the rinse agent recirculates and condenses a portion of the flux in the gas stream, thereby removing the portion from the gas stream.

In one embodiment, the system further includes a condenser fluidically connected to the scrubber chamber at a gas outlet of the scrubber chamber and adapted for reducing to a select condenser temperature the gas stream flowing therethrough thereby separating from the gas stream a portion of the rinse agent and the flux remaining in the gas stream.

The invention also features a method for removal of a flux from a gas stream comprising the steps of: introducing the gas stream containing the flux into a scrubber chamber; introducing a rinse agent in a liquid form at a selected temperature and in a selected pattern into a scrubber chamber; condensing a portion of the flux from the gas stream into the rinse agent; and removing the liquid agent and the portion of the flux condensed from the gas stream from the scrubber chamber.

These and other features, aspects, and advantages of the present invention will become better understood with regard to the following description and appended claims.

BRIEF DESCRIPTION OF THE SEVERAL VIEWS OF THE DRAWINGS

The invention will be more fully understood by reference to the following Detailed Description of the invention in conjunction with the Drawings, of which.

DETAILED DESCRIPTION OF THE INVENTION

The present application is a continuation of U.S. patent application Ser. No. 16/183,200 filed on Nov. 7, 2018, which claims priority to U.S. Provisional Application Nos. 62/583,152 and 62/684,485 filed respectively on Nov. 8, 2017 and Jun. 13, 2018, the disclosures of which are herein incorporated by reference.

Figure 1:
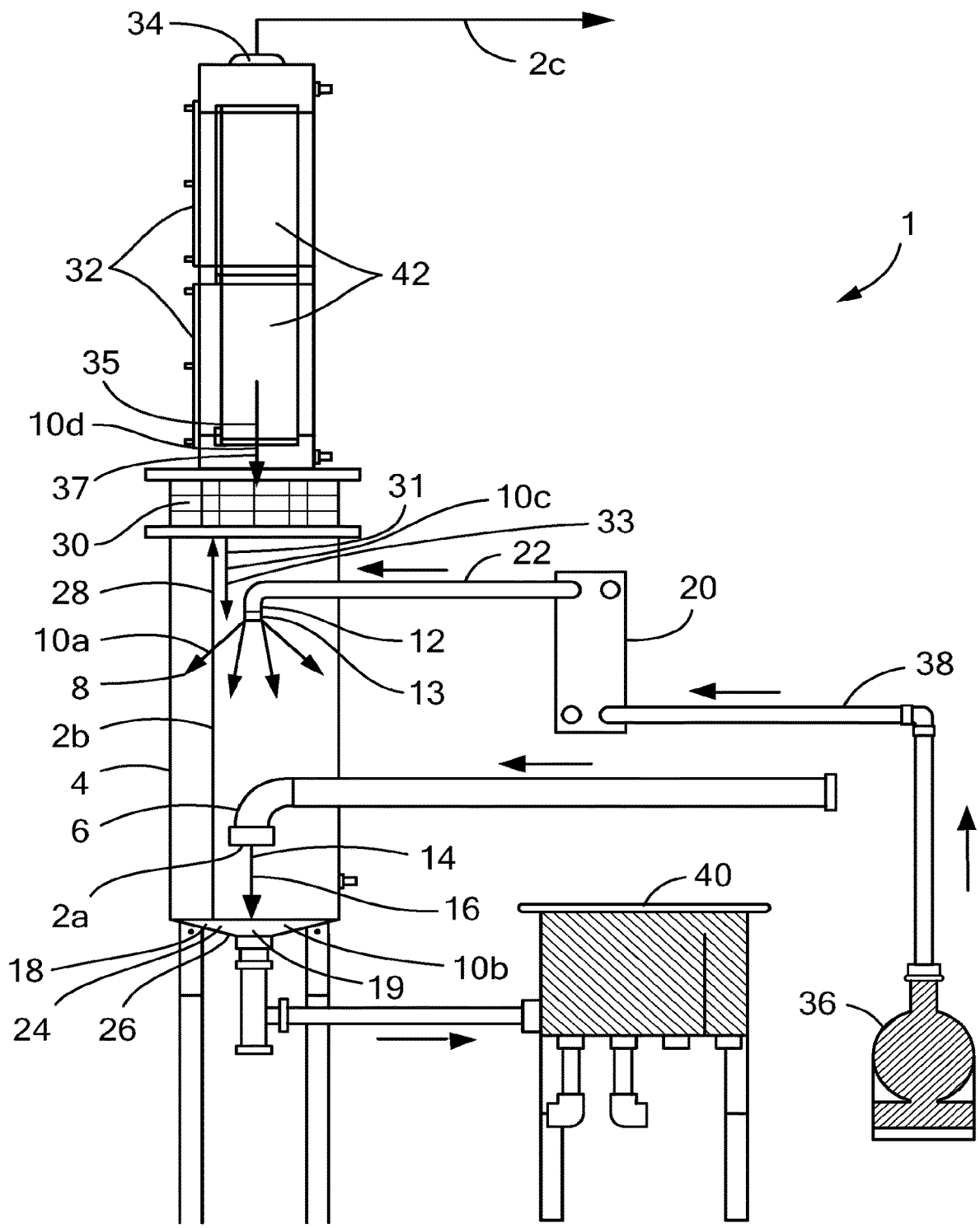
FIG. 1 is a diagrammatic view of a system according to an embodiment of the invention.

In one aspect, the invention features a flux removal system 1 as illustrated in FIG. 1. Process gas 2a from a furnace is introduced into a scrubber chamber or column 4 through a device 6, such as a 90° elbow, which is contacted by a solvent and/or rinse agent 10a emanating from one or more solvent or rinse agent delivery mechanisms 12. In one non-limiting example, the solvent or rinse agent delivery mechanism 12 is a spray nozzle(s) 13 which emits the solvent and/or rinse agent 10a in the form of a spray mist 8. The spray mist 8 cools the process gas delivery device or elbow 6 upon contact. A first portion 14 of flux 16 contained in the process gas 2 condenses as the process gas 2a passes out of the cooled process gas delivery device or elbow 6 and contacts the solvent 10a in the scrubber chamber 4. The first portion 14 of condensed flux collects in a portion 18 of the scrubber chamber 4. In a non-limiting embodiment, the scrubber chamber 4 is oriented vertically and the portion 14 of condensed flux falls to the bottom portion 19 of the scrubber chamber 4. Optionally, a chilled heat exchanger 20 can be provided in series with the feedline 22 of solvent 10a to lower the temperature of the solvent 10a entering the scrubber chamber or column 4 and increase the condensation effect.

Typical gas 2a flow rates into the scrubber chamber or column 4 are in the range of about 40-70 cubic feet per minute or CFM. The temperature of the process gas 2a entering the scrubber chamber 4 is in a range of about 160-180° C. The temperature of the solvent 10a entering the scrubber chamber 4 is in a range of 5-40° C., and preferably in a range of 20-30° C. Where a chilled heat exchanger 20 is used, the temperature of the solvent 10a entering the scrubber chamber 4 is in a range of about 10-20° C. and more preferably in a range of about 15-20° C.

The process gas 2a is directed down into a pool 24 of solvent and/or rinse agent 10b disposed in a portion 18, such as, for a non-limiting example, a lower portion or bottom 19 of the scrubber chamber or column 4 and a second portion 26 of flux 16 is removed from the process gas 2a by direct condensation of flux 16 in the lower temperature pool 24.

The process gas 2b flows upward in the scrubber chamber 4 through the spray mist 8 where chemical interaction between the process gas 2b and the solvent 10a of the spray mist 8 removes a third portion 28 of the remaining flux 16 and entraps it in the recirculating spray mist 8 of solvent 10a. The process gas 2b then travels through an optional first stage post-scrubber separator, such as, for a non-limiting example, a mist separator 30.

The mist separator 30 includes a plurality of baffles or perforated plates. The baffles or perforated plates are arranged in series. The baffles or perforated plates cause directional changes in the gas flow which in turn cause liquid 31 containing solvent and/or rinse agent 10c in the gas stream to coalesce into large droplets. In a non-limiting, exemplary vertical embodiment, the large droplets pass through the holes of the baffles or perforated plates and drain via gravity back into the scrubber chamber or column 4. The liquid 31 captured in the mist separator 30 can include a fourth portion 33 of flux 16 remaining in the process gas. In an exemplary embodiment, the first stage separator or mist separator 30 is operated in a temperature range of about 20-60° C.

After the first stage separator or mist separator 30, the gas passes through an optional second stage separator such as a condenser 32 which condenses any liquid 35 including any remaining solvent and/or rinse agent 10d and fifth portion 37 of flux 16 remaining in the process gas stream 2. In a non-limiting embodiment including an exemplary vertical configuration, the liquid 35 drains back into the scrubber chamber or column 4 by gravity. In an exemplary embodiment the second stage separator or condenser 32 is operated in a temperature range of about 5-35° C.

The cleaned process gas 2c is removed from the flux removal system 1 at, in a non-limiting exemplary embodiment, the upper end 34 of the optional condenser 32 and can be returned to the process chamber of the reflow furnace. A pump 36 can transport the solvent or rinse agent 10a from a solvent reservoir vessel via the feedline 38, or via line 22 where optional heat exchanger 20 is implemented, to the one or more solvent and/or rinse agent delivery mechanisms 12. A tank 40 collects solvent and/or rinse agent 10b from the portion 18 of the scrubber chamber 4 for recycling and/or disposal.

Column packings 42 with, for non-limiting examples, geometric shapes or Raschig Rings, can be used to increase the path length of the process gas stream and therefore the residence time as the process gas 2b is transported through the scrubber chamber or column 4 and/or the optional condenser 32. Within each scrubber chamber or column 4 and/or condenser 32, the column packings 42 can include similar or different shapes and materials, and can be arranged in one or more layers or arrays of similar or different configurations.

Many types of solvents and/or rinse agents 10 can be used with the systems of the invention without modification of the systems. For non-limiting examples, a wide range of water based and organic or inorganic solvents can be used as rinse agents in the novel scrubbing system. Removal of waste flux from the system can be accomplished in several ways through selection of the appropriate solvent and/or rinse agent chemistry and configuration of the solvent and/or rinse agent reservoir tank 36 and solvent and/or rinse agent supply lines 38 and/or 20.

In one embodiment, an organic solvent such as 2-propanol can be used as the rinse agent which acts as a solvent for the flux and can result in a stable dispersion. When the solvent is saturated with flux, it can be drained from the system reservoir tank and disposed in an appropriate waste stream. As an example, the rinse agent can be undiluted 99% 2-propanol.

In another embodiment, petroleum distillates such as mineral spirits can be used as the rinse agent. This rinse agent will act as a solvent for the flux and also can result in a stable dispersion. When the solvent is saturated with flux, it can be drained from the system reservoir tank and disposed in an appropriate waste stream. An example of a rinse agent is undiluted white mineral spirits.

In a third embodiment, water can be used as the rinse agent. The water can be modified with a surfactant and/or detergent which will allow the flux to combine with the aqueous rinse agent to provide a stable dispersion which again can be drained and disposed of in an appropriate waste stream when saturated with flux. In an exemplary and non-limiting embodiment, the rinse agent can include 3% Tergitol 15-S, 0.05% Disperbyk and 96.9% water. In an alternative exemplary and non-limiting embodiment, the rinse agent can include Sodium Laurate, alpha Terpineol, mineral spirits and water.

A stable dispersion is formed when sufficient surfactant is present to fully surround and impart a hydrophilic nature to the flux molecules. In the stable dispersion, the flux remains uniformly dispersed in the solvent or rinse agent, and the solvent with dispersed flux can be drained from the scrubber chamber 4 into tank 40 for subsequent disposal.

In a further embodiment, water can be used as a rinse agent when modified with a surfactant and/or detergent which allows the flux to form a metastable suspension in the rinse water during operation and further allows the suspension to separate into two distinct phases upon settling. After a settling period, the flux phase will segregate at the top of the water phase. A metastable suspension is formed when the concentration of surfactant is at or slightly lower than the critical micelle formation level. Stability of the rinse agent can also be controlled using builder materials such as sodium silicate to peptize the flux.

Commercially available cleaners and detergents can also be used as the active ingredient in rinse agents. A wide range of off-the shelf cleaners and degreasers can be used in this system to effectively segregate flux in an aqueous carrier. Examples include, but are not limited to: Lestoil Heavy-Duty Cleaner™, PineSol™, and Dawn™ dish washing liquid.

Figure 2:
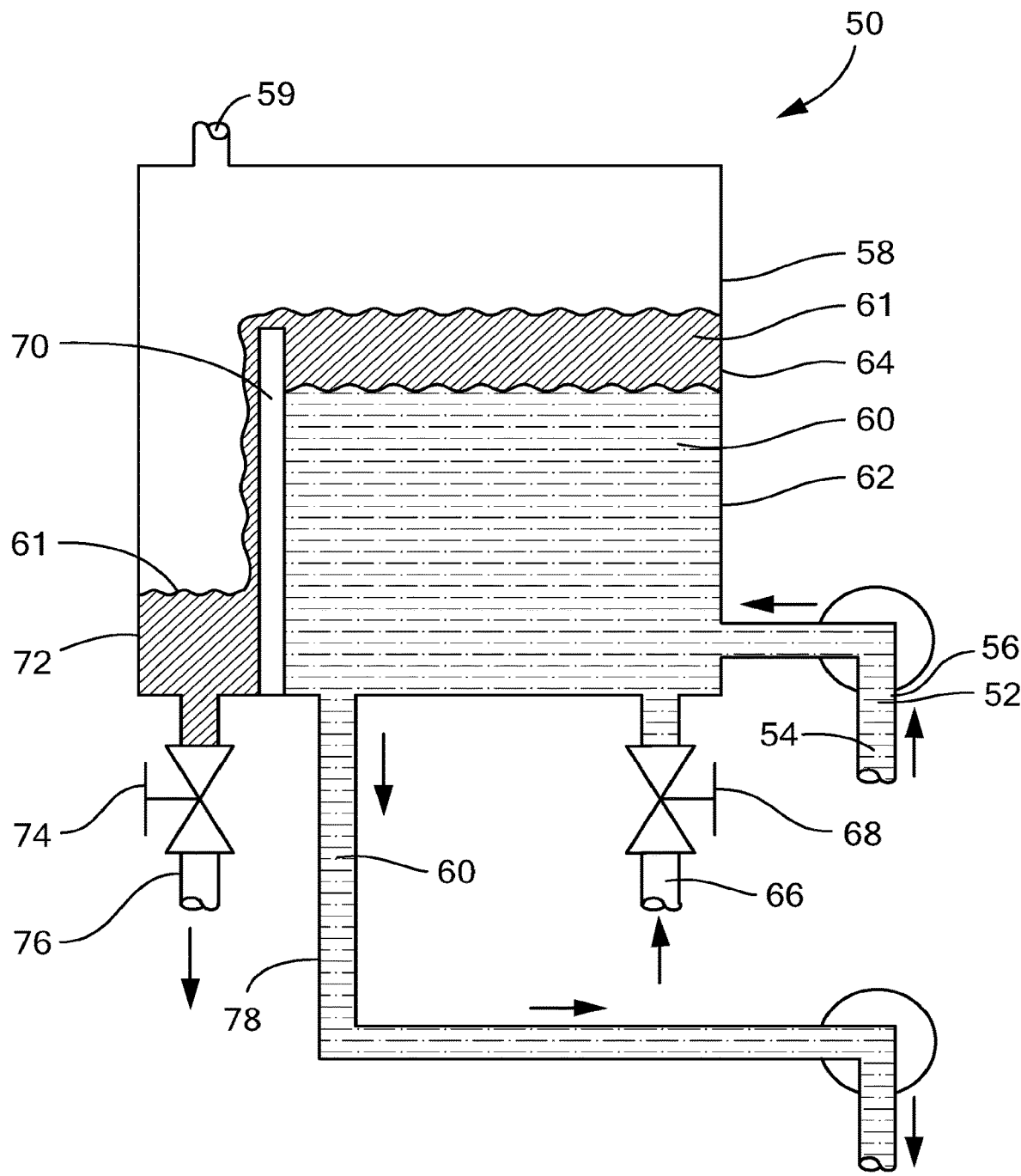
FIG. 2 is a diagrammatic view of a system according to an embodiment of the invention.

FIG. 2 shows a system 50 for segregation and removal of flux 52 from a fluid 54 containing solvent and/or rinse agent 56 and flux 52. Fluid 54 is received in a reservoir tank 58 including vent 59. After a settling period, a solvent and/or rinse agent phase 60 of the fluid 54 settles towards the bottom layer or portion 62 of the reservoir tank 58, and a flux phase 61 rises to the top layer or portion 64 of the reservoir tank 58. Make-up solvent and/or rinse agent 66 is pumped via valve 68 into the reservoir tank 58 which causes the flux phase 61 to pass over a weir 70 into a drain portion or compartment 72 of the reservoir tank 58. The flux phase 61 in the drain portion or compartment 72 can be drained or removed from the reservoir tank 58 via valve 74 and line 76. The solvent or rinse agent phase 60 can be removed from the reservoir tank 58 via line 78.

Figure 3:
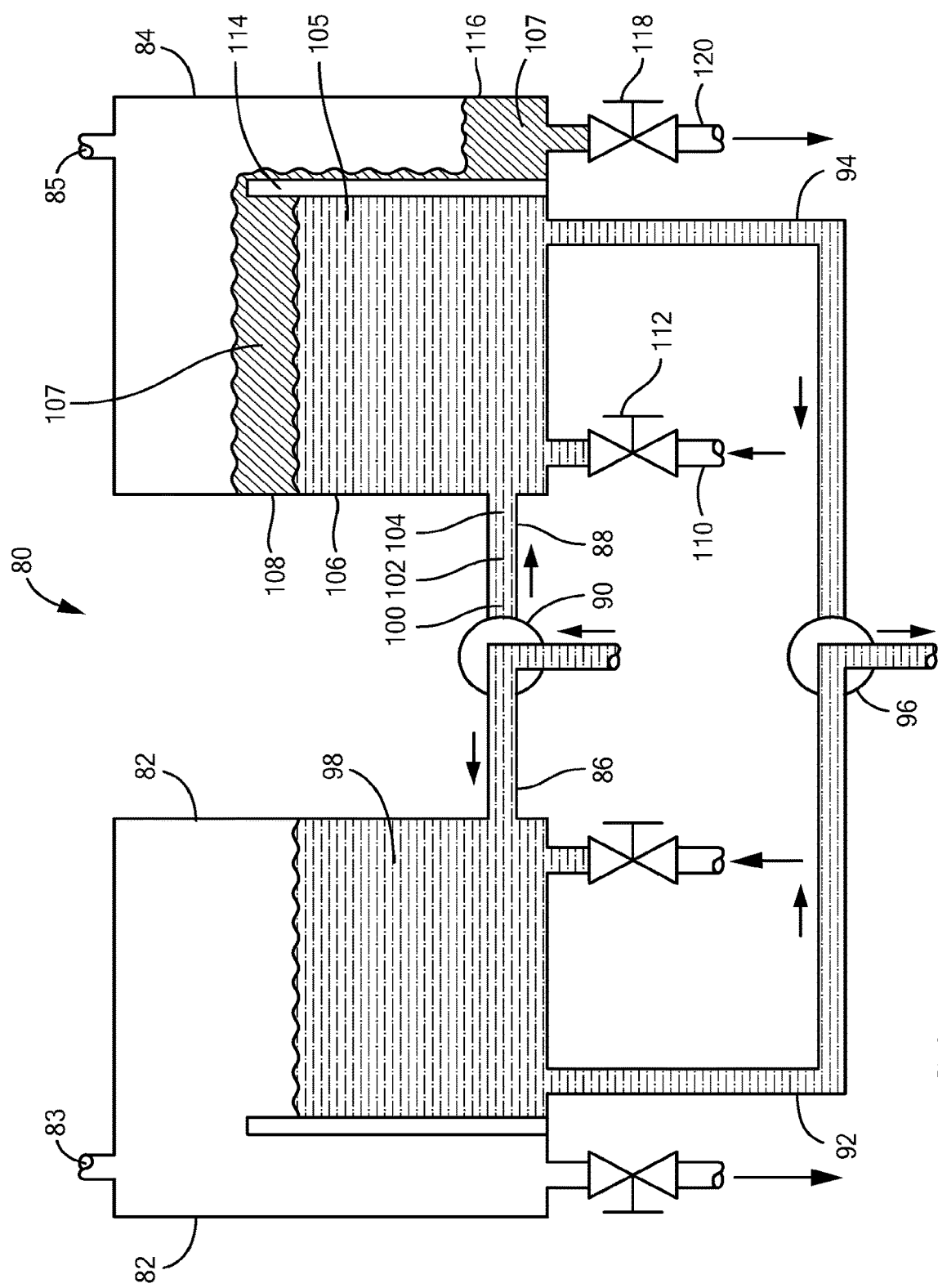
FIG. 3 is a diagrammatic view of a dual reservoir system for continuous operation in accordance with an embodiment of the invention.

FIG. 3 shows a system 80 configured for continuous operation. The system 80 includes at least one reservoir tank 82 including vent 83 and at least one second reservoir tank 84 including vent 85. Each of reservoir tank 82 and 84 includes a first fluid line, respectively 86 and 88, interconnected with a three-way valve 90 and a second fluid line, respectively 92 and 94, interconnected with a three-way valve 96. During operation, three-way valve 90 can be adjusted to isolate reservoir tank 82 from reservoir tank 84. Reservoir tanks 82 and 84 can be operated thereby as respective active and settling reservoir tanks. The reservoir tank 82 can receive via first fluid line 86 solvent and/or rinse agent 98. The solvent or rinse agent 98 can exit reservoir tank 82 via second fluid line 92. The reservoir tank 84 can receive via first fluid line 88 fluid 100 containing solvent and/or rinse agent 102 and flux 104. After a settling period, a solvent and/or rinse agent phase 105 can settle into a layer in a bottom portion 106 of the reservoir tank 84 and can be drained via the second fluid line 94 as necessary. A flux phase 107 can rise to an upper layer in a top portion 108 of the reservoir tank 84. Make up solvent and/or rinse agent can be pumped via line 110 and valve 112 into the reservoir tank 84 causing the upper flux phase 107 to rise and surpass the weir 114. The flux phase 107 can collect in the drain portion or compartment 116 of the reservoir tank 84 and ultimately can be drained via the valve 118 and corresponding fluid line 120.

After the flux phase or flux waste 107 is drained, the reservoir tanks 82 and 84 can be switched or alternated by the adjustment of the three-way valves 90 and 96, as necessary and the cycle can be repeated.

Figure 4:
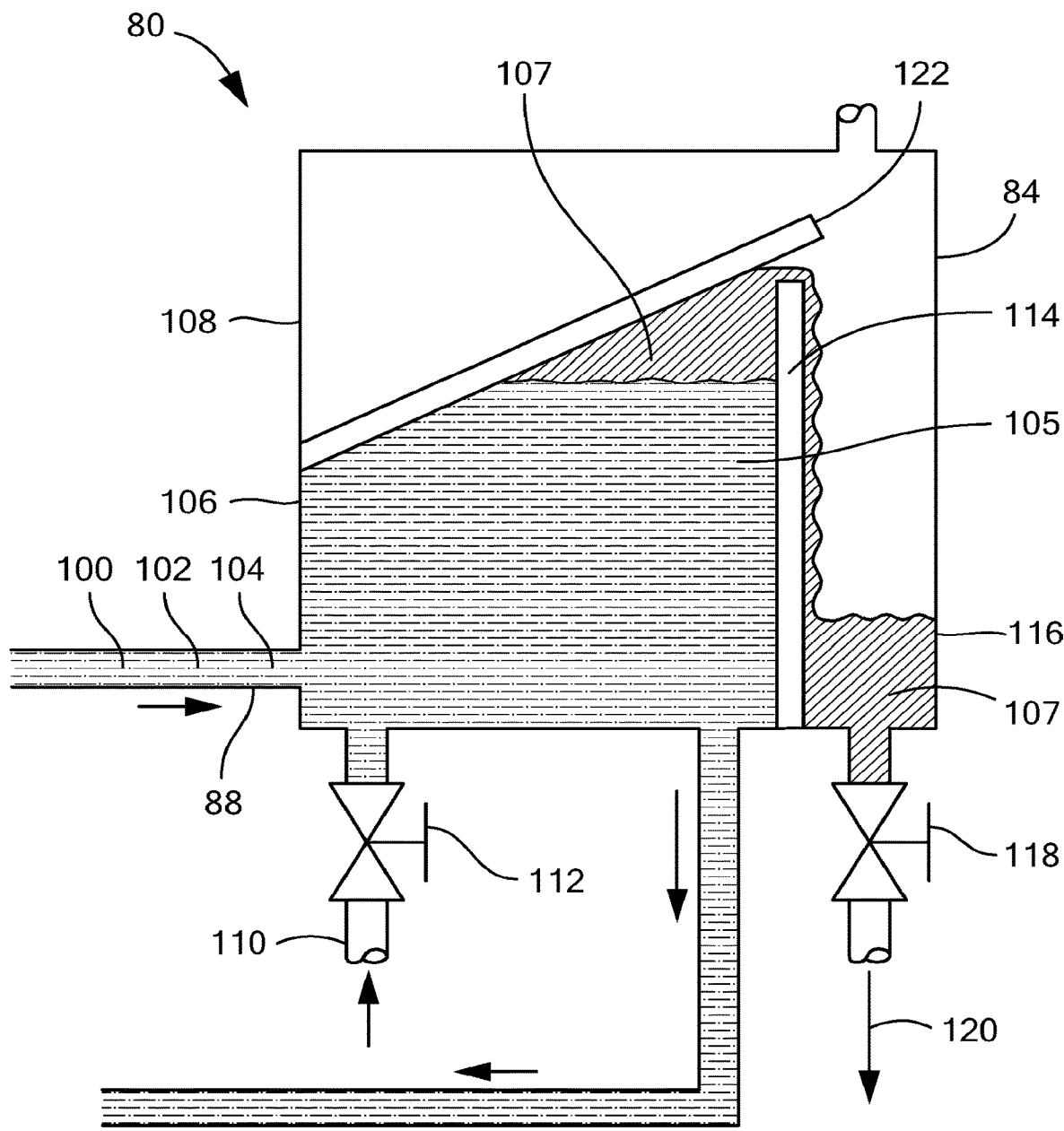
FIG. 4 is a diagrammatic view of a system according with an embodiment of the invention.

FIG. 4 shows an alternative embodiment where the reservoir tank 84 as shown in FIG. 3 includes an inclined cover 122. After the settling period when the flux phase 107 rises to an upper layer at a top portion 108 of the reservoir tank 84, the flux phase 107 contacts the inclined cover 122. Flow of flux phase 107 over the weir 114 is accelerated and the flux phase 107 flows more uniformly over the weir 114.

Figure 5:
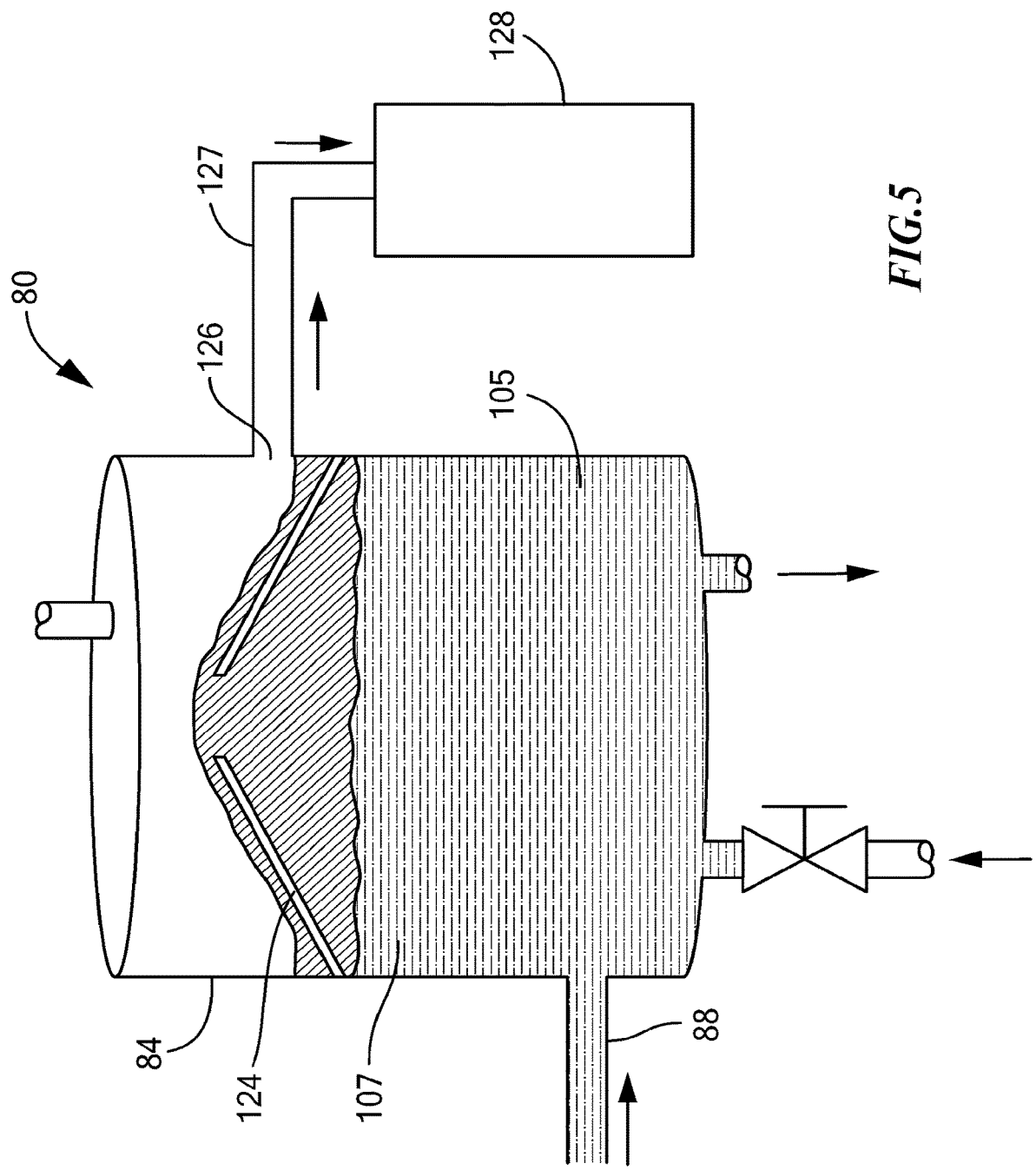
FIG. 5 is a diagrammatic view of a system according with an embodiment of the invention.

In an alternative embodiment, the reservoir tank 84 as shown in FIG. 4 can include a cover 124 of a selected geometric shape, such as, for a non-limiting example, a cone shape, as shown in FIG. 5 in lieu of the inclined cover 122, as shown in FIG. 4. The cover 124 can progressively constrict the fluid capacity of the reservoir tank thereby further directing the flux phase 107 to surpass, for example, the weir 114 as shown in FIG. 4 or to pass through an opening 126 in a side wall of the tank 84 and drained through a line 127 into a holding tank 128, as shown in FIG. 5. The geometric shape of the cover can be selected according to the shape of the reservoir tank. For a non-limiting example, a cover having a conical shape cover can be selected for a cylindrical reservoir tank. A cover having pentahedral shape can be selected for a rectangular tank.

Figure 6:
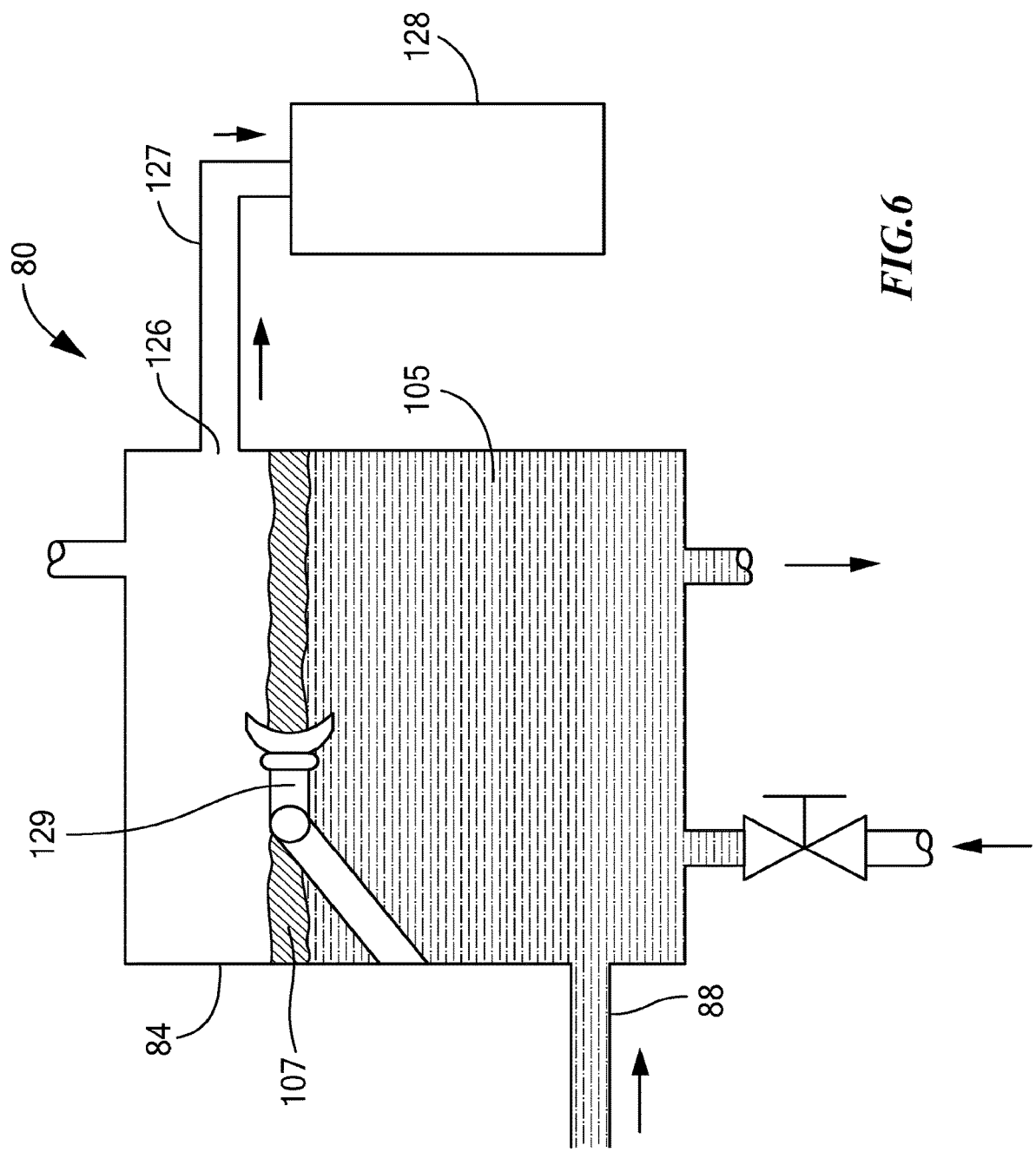
FIG. 6 is a diagrammatic view of a system including a mechanical skimming device according to an embodiment of the invention.

In an alternative embodiment, the flux phase or floating flux waste can be removed from the reservoir tank using a mechanical skimming device such as an oil skimmer as commonly used for removal of cutting oils from aqueous coolants in machining applications. FIG. 6 shows a non-limiting example of a mechanical skimming device 129 which can be used in accordance with a device or system of the invention.

The solvent and/or rinse agent make-up can be supplied from a fixed reservoir containing pre-mixed chemistry. Alternatively, make-up solvent and/or rinse agent can be supplied by a system comprised of a line from a water source connected to an automatic addition device which continuously adds concentrated rinse agent chemistry to the water in the proper proportion.

An example embodiment of a rinse agent formulation employs 0.6% Lauric acid Ethoxylate, 1% mineral spirits, 1% Terpineol and 97.4% water.

In an exemplary embodiment, flux can also be separated into semi-solid, buoyant forms by using solvent and/or rinse agent formulations incorporating Sodium laurate. These buoyant forms will continue to grow as more flux in the liquid solution is attracted to the floating mass. A cyclonic liquid flow condition can be induced in, for a non-limiting example, a cylindrical reservoir by directing liquid so that it circles the cylindrical reservoir relatively slowly thereby preventing the floating mass of flux from adhering to the walls along the inside circumference of the reservoir. In one non-limiting embodiment, the solvent and/or rinse agent can be directed tangential to a tank wall or enclosure to facilitate a desired fluid flow movement such as a swirling fluid movement for prevention of flux adherence to the reservoir. When the floating mass of flux has accumulated in an appropriate amount for disposal, the floating flux mass can be removed from the reservoir manually, or by automated means.

An example formulation for this approach includes 1% Sodium Laurate, 0.8% Mineral Spirits, 0.5% terpineol and 97.7% water as the rinse agent.

Figure 7:
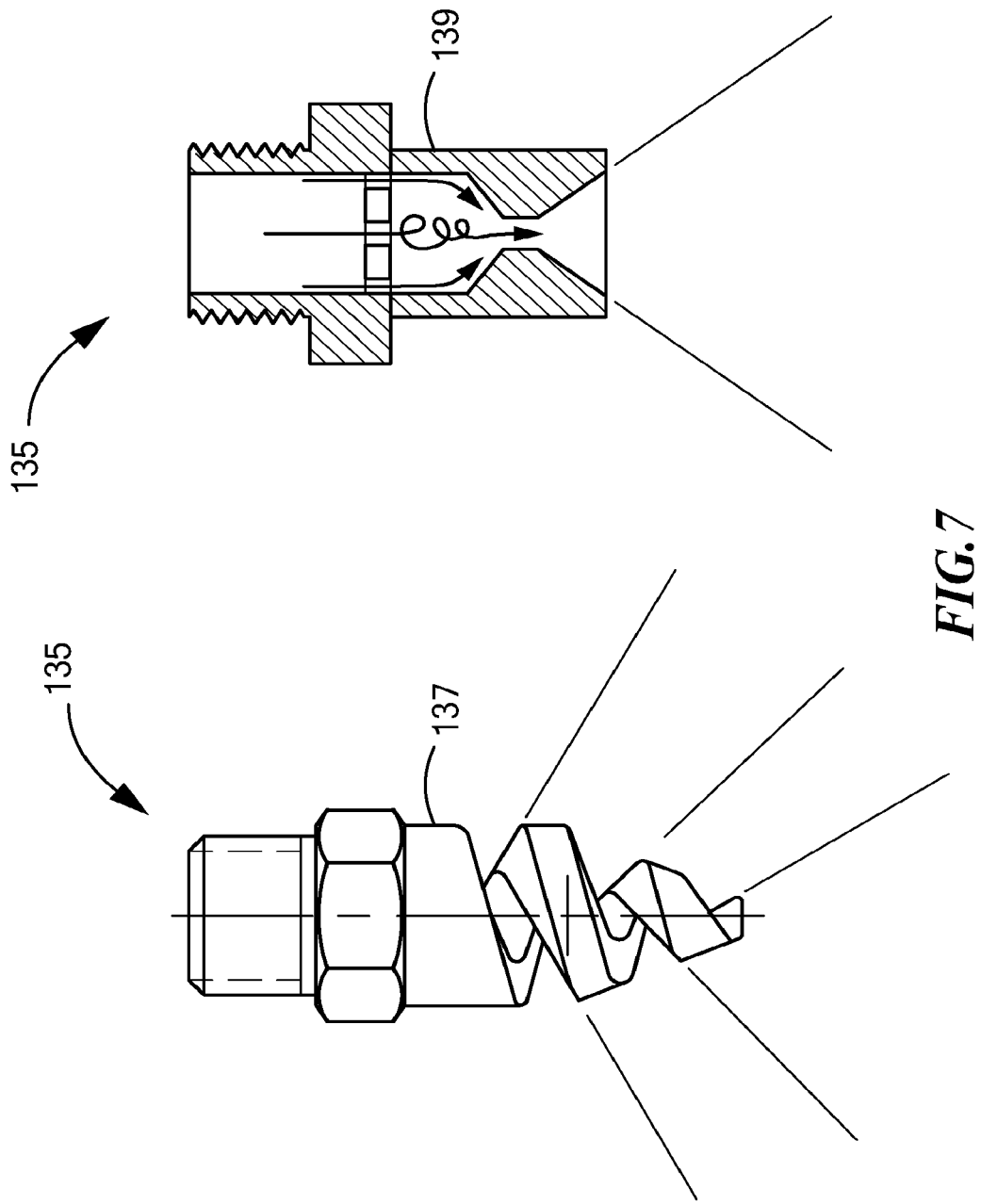
FIG. 7 is a view of solvent and/or rinse agent delivery mechanisms according to embodiments of the invention.

It will be appreciated that the devices and systems of the invention can be implemented in a variety of ways. For example, a solvent and/or rinse agent delivery mechanism can include one or more nozzles, such as spray nozzles, or combinations of same or different nozzles, for production of selected spray pattern(s) and volume(s) for interaction with the flowing process gas and the device through which it flows into the scrubber chamber or column. One non-limiting exemplary nozzle implementation can include a full cone 90° including an angle spray head. In a preferred embodiment, the solvent and/or rinse agent delivery mechanism includes a nozzle, such as a spray nozzle, which has a relatively low restriction and is not prone to clogging. In one preferred exemplary embodiment, the solvent and/or rinse agent delivery mechanism 135 includes a Bete TF Series spiral nozzle 137, as shown FIG. 7. In another exemplary embodiment, the solvent and/or rinse agent delivery mechanism 135 includes a Bete NC Series spray nozzle 139, also shown in FIG. 7. In still other exemplary embodiments, the solvent and/or rinse agent delivery mechanism is selected from Bete WL Series and MaxiPass™ spray nozzles. In addition, different shaped tanks or tanks of different forms can be used for one or more tanks, columns and/or chambers of the invention. For non-limiting examples, circular tanks can be used. In other non-limited examples, rectangular tanks can be used.

Figure 8:
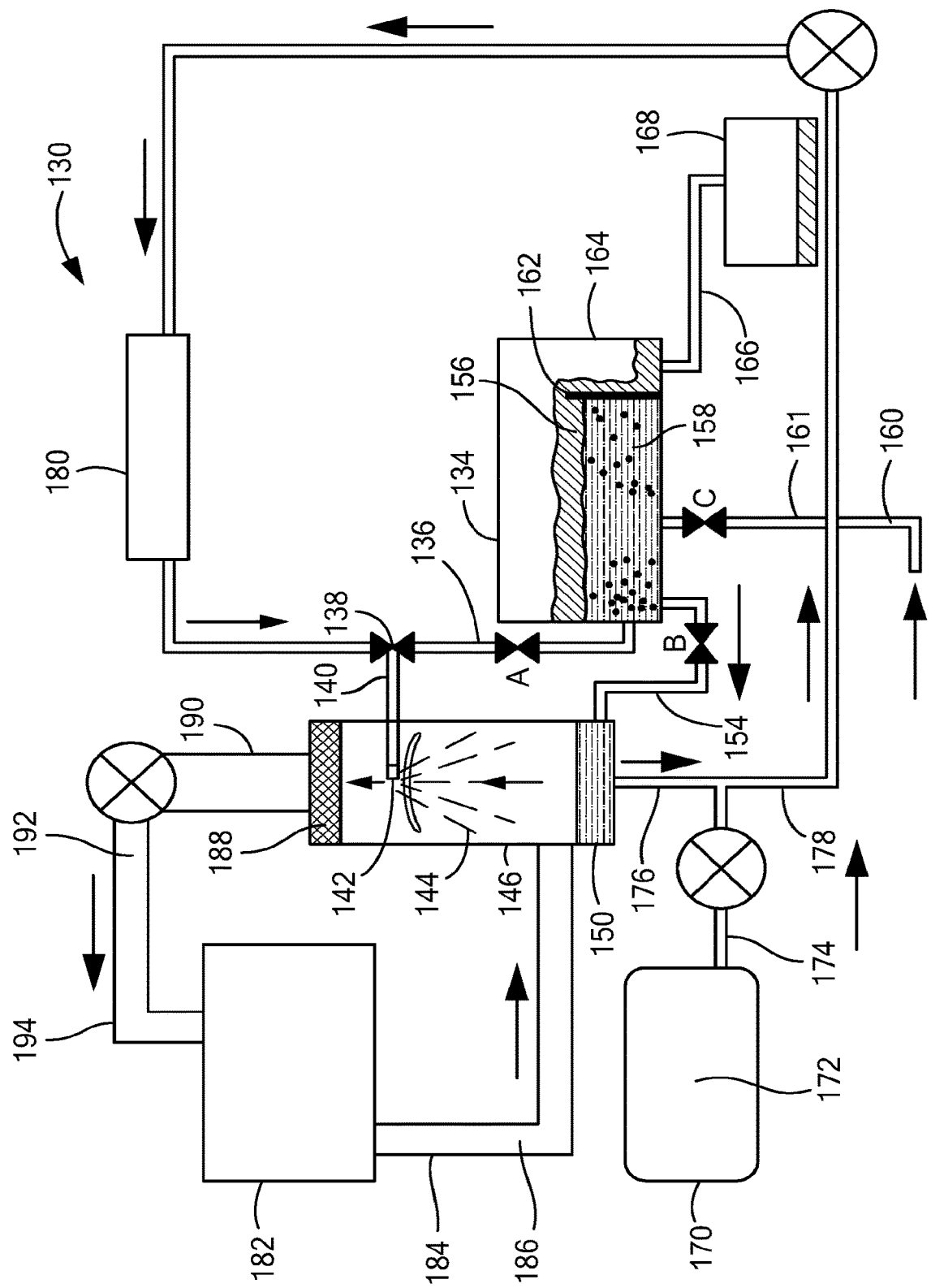
FIG. 8 is a diagrammatic view of a system according with an embodiment of the invention.

In another embodiment, system 130 includes a single reservoir tank 134, as shown in FIG. 8. Solvent and/or rinse agent 172 is contained in solvent and/or rinse agent tank 170. Tank 170 is fluidically connected via line 174 to line 178 which passes through optional heat exchanger 180 for optionally cooling the fluid of line 178 including recirculating solvent and/or rinse agent. Line 178 is fluidically connected to pressurized line 140 which in turn is connected to the solvent delivery mechanism 142 for delivery of solvent and/or rinse agent 172 to the scrubber chamber or column 146. The solvent and/or rinse agent 172 can be delivered in a selected flow pattern, such as a spray pattern 144.

A valve 138, such as a throttle valve, can be used to direct the fluid or a portion of the fluid in line 178 away from line 140 and into line 136 which is fluidically connected to the single reservoir tank 134. An optional isolation valve A can be used to close offline 136 altogether. Fluid in line 136 is pumped at a low flow rate into the single reservoir tank 134. The low flow rate allows a flux phase 156 to separate from the solvent or rinse agent phase 158 and float to the upper portion or top of the single reservoir tank 134 forming an upper layer without requiring the single reservoir tank 134 to be inactive for separation to occur. The flux phase 156 is then removed by adding make up solvent or rinse agent 160, such as for a non-limiting example water, to the single reservoir tank 134 via line 161 and throttle valve C thereby flushing the floating flux phase 156 over the weir 162 into flux waste compartment 164. The flux waste compartment 164 can then be drained via line 166 to flux phase or flux waste tank 168. The solvent and/or rinse agent phase 158 which settles towards the lower portion or bottom of the single reservoir tank 134 in a lower layer can be drained via line 154 and throttle valve B into the scrubber chamber of column 146.

Fluid 150 collected in the scrubber chamber or column is drained via line 176. Line 176 together with line 174 from the solvent or rinse agent tank 170 are fluidically connected to line 178 which is recirculated back to the scrubber chamber or column 146 through optional heat exchanger 180. The solvent and/or rinse agent contained in the fluid 150 drained via line 176 from the scrubber column or chamber 146 is thus recirculated back to the scrubber chamber or column 146 for further flux removal as needed.

FIG. 8 also shows furnace or oven 182 emits process exhaust gas 184 which is plumbed via line 186 into scrubber chamber or column 146. Treated process gas from the scrubber chamber or column 146 passes through an optional condenser 188 and optional dehumidifier 190 after which the substantially flux free process gas 192 is recirculated via line 194 back to the furnace 182.

Figure 9:
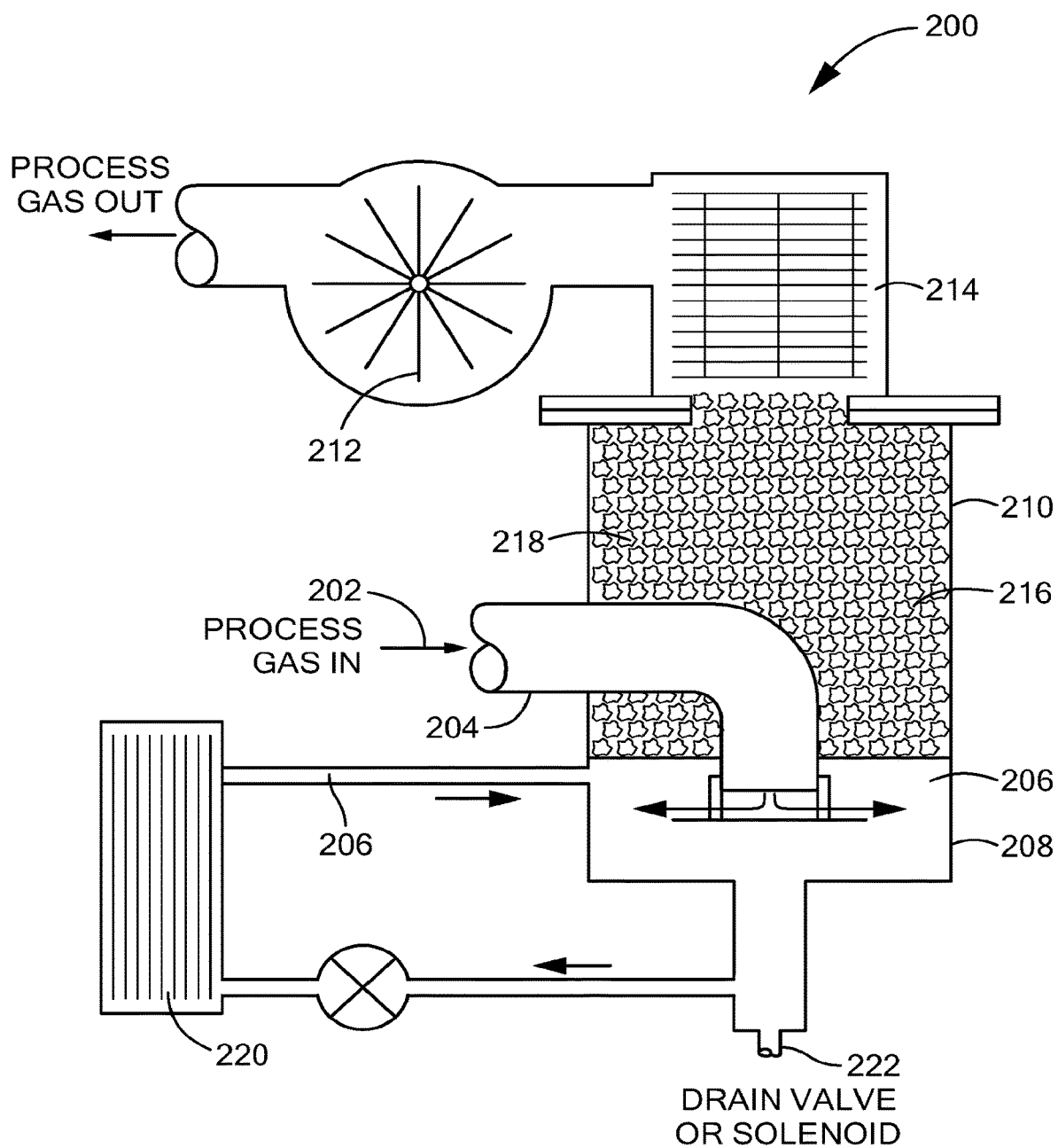
FIG. 9 is a diagrammatic view of a system according with an embodiment of the invention.

In another embodiment, the invention features the simplified system 220 shown in FIG. 9 where a rinse agent delivery mechanism and fluid reservoir tank are omitted. In this embodiment, process gas 202 is introduced via line 204 into a first, lower or bottom portion 208 of a scrubber chamber or column 210. Solvent and/or rinse agent 206 is contained in portion 208 of the scrubber chamber or column 210. A gas withdrawal device including a blower 212 draws the process gas 202 through a height or length of the scrubber chamber or column 210 thereby causing the liquid solvent and/or rinse agent 206 to percolate through the packing 218 of the scrubber chamber or column 210. The percolation facilitates further interaction of the process gas 202 with the solvent and/or rinse agent 206. During such interactions, flux 216 from the process gas 202 is transferred to the solvent and/or rinse agent 206. The solvent and/or rinse agent 206 is pumped continuously through a heat exchanger 220 and returned to the scrubber chamber or column 210 for removal of heat associated with the incoming process gas 202. When the solvent and/or rinse agent 206 becomes saturated with flux 216, the solvent and/or rinse agent 206 can be drained from the scrubber chamber of column 210 via drain valve 222, such as, for non-limiting examples, a solenoid valve. In a preferred embodiment, the rinse agent formulation contains 40 ml of a heavy-duty cleaner, such as, for a non-limiting example, Lestoil Heavy-Duty Cleaner™ in 6000 ml or 6 liters of water.

In one exemplary and non-limiting embodiment, an optional condenser 214 is fluidically connected to the scrubber chamber or column 210 where the process gas exits the scrubber chamber or column 210. Process gas is drawn through the condenser 214 following the percolation through the scrubber chamber or column 210 thereby condensing solvent and/or rinse agent including, for a non-limiting example, water, prior to the cleaned process gas exiting the system. Once the cleaned process gas exits the system, the cleaned process gas can then be re-introduced into furnace as necessary or desired.

Example 1

Figure 10:
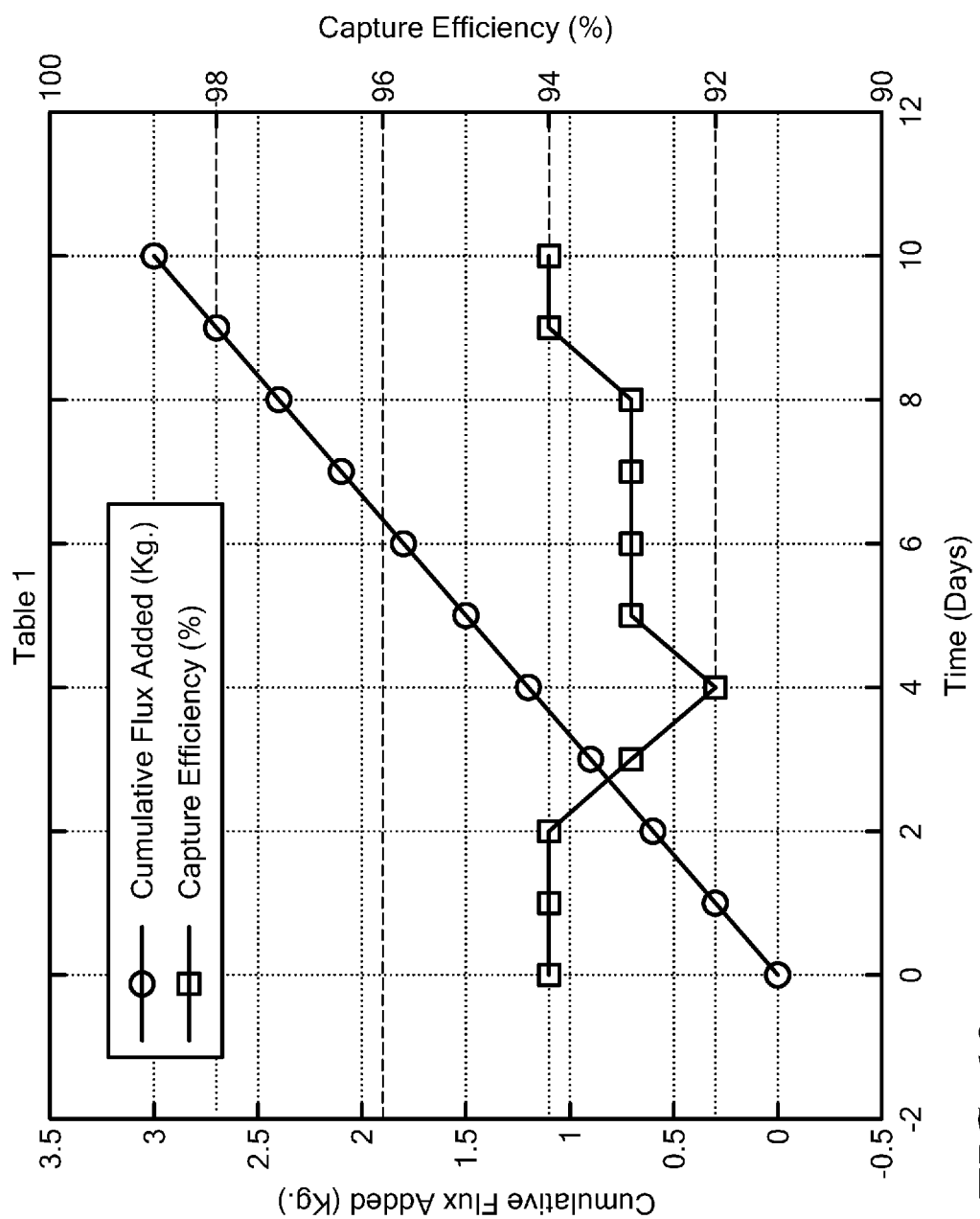
FIG. 10 includes Table 1 showing the testing results for flux capture efficiency using the system and method according to an embodiment of the invention.

Flux capture efficiency was tested using the system and method of the embodiment shown In FIG. 1. Ten eight-hour daily runs were conducted. Each day, an amount of 300 grams of Aim Solder Solutions No-Clean Flux was added to a process gas of 100% nitrogen and vaporized at a temperature of 250 C. A re-circulating volume of rinse agent including 0.2% Lestoil™ Concentrated Cleaner in 24 liters of water was used to capture the flux and the amount of captured flux was weighed at the end of each daily run. The percentage of input flux captured each day is shown in Table 1 included in FIG. 10. A capture of 92-94% efficiency was realized throughout the flux capture efficiency trial. The capture efficiency of the rinse agent did not degrade during the trial period.

In the present specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. The contents of all references, pending patent applications and published patents, cited throughout this application are hereby expressly incorporated by reference as if set forth herein in their entirety, except where terminology is not consistent with the definitions herein. Although specific terms are employed, they are used as in the art unless otherwise indicated.

What is claimed is:

1. A system for removal of a flux in a gas stream, the system comprising:
    a scrubber chamber having a gas inlet through which the gas stream is introduced into the scrubber chamber, and a gas outlet through which the gas stream is withdrawn from the scrubber chamber;
    at least one rinse agent delivery mechanism for introducing a rinse agent into the scrubber chamber for contact with the gas stream;
    a condenser portion of the scrubber chamber for receiving the gas stream at a temperature for condensing a second portion of the flux in the gas stream;
    a condensed flux removal apparatus adapted for removal from the scrubber chamber of at least a portion of the rinse agent and the flux which has condensed;
    wherein the condensed flux removal apparatus comprises a first liquid collector comprising:
        a tank having a first compartment and a second compartment and a wall separating the first compartment and the second compartment defining a weir at an upper end of the wall;
        wherein the first compartment is operative to contain a liquid containing the rinse agent and the flux received from the scrubber chamber, the liquid over a time period being separated into a flux phase disposed in an upper layer of the first compartment and a rinse agent phase disposed in a lower layer of the first compartment;
        a rinse supply apparatus for introducing the rinse agent into the first compartment in an amount sufficient to cause the flux phase to flow over the weir from the first compartment into the second compartment; and
        a flux waste removal apparatus for removing the flux phase from the second compartment; and
    wherein the condensed flux removal apparatus comprises a second liquid collector comprising:
        a valve system selectively coupled to the first liquid collector and the second liquid collector such that the first and the second liquid collectors are alternately coupled to the scrubber chamber to collect the rinse agent and the flux, while the other of the liquid collectors is decoupled from the scrubber chamber to permit removal of the flux phase from the second compartment of the decoupled flux collector.

2. The system of claim 1, wherein the system comprises a mist separator fluidically connected to the scrubber chamber and comprising at least one component for separation from the gas stream a portion of the rinse agent and the flux remaining in the gas stream flowing therethrough.

3. The system of claim 2, wherein the mist separator comprises a plurality of perforated plates in series.

4. The system of claim 1, wherein the system comprises a condenser fluidically connected to the scrubber chamber and operated at a select temperature for separating from the gas stream at least a portion of the rinse agent and the flux remaining in the gas stream flowing therethrough.

5. The system of claim 4, wherein at least one of the scrubber chamber and the condenser comprises a packing material for increasing a residence time of the gas stream travelling therethrough.

6. The system of claim 1, wherein the rinse agent comprises a solvent which forms a stable dispersion of the flux and the solvent.

7. The system of claim 1, wherein the rinse agent comprises a water component and a second component forming at least one of a stable dispersion and a metastable suspension of the flux and the water component.

8. The system of claim 7, wherein the second component includes at least one of a detergent and a surfactant.

9. The system of claim 1, wherein the first liquid collector comprises a cover of a geometric shape selected for a predetermined flow path of the liquid contained in the liquid collector.

10. The system of claim 1 further comprising a skimming device for capture or directing a flow of the flux phase.

11. The system of claim 1,
    wherein the rinse agent delivery mechanism comprises at least one spray nozzle having an opening disposed in a direction facing the pool of the rinse agent and configured for emitting the rinse agent in a form of a spray mist;
    wherein the scrubber chamber is configured such that gas stream exiting the pool of the rinse agent flows through the spray mist and the rinse agent removes a third portion of flux from the gas streams by entrapping the third portion in the rinse agent.

* * * * *